US009327630B1

(12) United States Patent  
Edgar et al.

(10) Patent No.: US 9,327,630 B1  
(45) Date of Patent: May 3, 2016

(54) SEAT BACK CUSHION FOR A VEHICLE

(71) Applicant: Toyota Motor Engineering & Manufacturing North America, Inc., Erlanger, KY (US)

(72) Inventors: Patrick J. Edgar, Ann Arbor, MI (US); Yi-Ru C. Sosnowski, Ann Arbor, MI (US); Robert J. Hazlewood, Plymouth, MI (US); Leon Toma, Commerce Township, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/525,906

(22) Filed: Oct. 28, 2014

(51) Int. Cl.
| | | |
|---|---|---|
| *A47C 7/14* | (2006.01) | |
| *A47C 7/18* | (2006.01) | |
| *B60N 2/64* | (2006.01) | |
| *B60N 2/66* | (2006.01) | |

(52) U.S. Cl.
CPC . *B60N 2/646* (2013.01); *B60N 2/66* (2013.01)

(58) Field of Classification Search
CPC .................................. B60N 2/646; B60N 2/66
USPC ........................................ 297/452.32, 452.48
See application file for complete search history.

(56) References Cited

U.S. PATENT DOCUMENTS

| | | | |
|---|---|---|---|
| 2,976,916 A * | 3/1961 | Peter Schladermundt et al. ................... 297/452.32 X |
| 4,718,153 A * | 1/1988 | Armitage et al. ..... 297/452.48 X |
| 5,085,488 A * | 2/1992 | Dal Monte ............... 297/452.32 |
| 7,090,292 B2 | 8/2006 | Dellanno | |
| 7,134,716 B2 | 11/2006 | Wieclawski | |
| 7,695,015 B2 | 4/2010 | Breed | |
| 8,104,840 B2 * | 1/2012 | Tarumi et al. ............ 297/452.48 |
| 8,162,402 B2 * | 4/2012 | Yamauchi ................ 297/452.48 |
| 8,991,930 B2 * | 3/2015 | Laframboise et al. ... 297/452.32 X |
| 2009/0058167 A1 * | 3/2009 | San Miguel et al. ...... 297/452.48 |
| 2010/0171346 A1 * | 7/2010 | Laframboise et al. ... 297/452.48 X |
| 2010/0194171 A1 * | 8/2010 | Hirata et al. ............. 297/452.48 |
| 2010/0301649 A1 * | 12/2010 | Mathews et al. ..... 297/452.48 X |
| 2012/0062014 A1 * | 3/2012 | Walker et al. ......... 297/452.48 X |
| 2012/0313409 A1 * | 12/2012 | Michalak ............. 297/452.48 X |
| 2014/0070594 A1 * | 3/2014 | Awata et al. ............. 297/452.48 |
| 2015/0028650 A1 * | 1/2015 | Rossi et al. .............. 297/452.48 |

FOREIGN PATENT DOCUMENTS

JP      2011051532 A      3/2011

* cited by examiner

*Primary Examiner* — Rodney B White  
(74) *Attorney, Agent, or Firm* — Christopher G. Darrow; Darrow Mustafa PC

(57) ABSTRACT

A seat back cushion for a vehicle includes a back surface including a plurality of indentations, the plurality of indentations including a plurality of generally vertical indentations and a plurality of generally horizontal indentations.

16 Claims, 6 Drawing Sheets

US 9,327,630 B1

SEAT BACK CUSHION FOR A VEHICLE

BACKGROUND

The present disclosure relates generally to a safety system for a vehicle and, more particularly, to a seat cushion for a vehicle that facilitates protection of an occupant's head during a rear impact event.

Optimization of active airbag operation, and passive movement control of vehicle occupants during an impact event is undergoing continuous improvement. One particular desirable movement control is that of an occupant's head during a rear impact event. For example, some vehicles include an active system that actuates features in a seat headrest to facilitate proper movement of the occupant's head during the rear impact event. Although effective, such active seat headrest systems are relatively complicated, and expensive.

SUMMARY

The seat back cushion for a vehicle described herein can be used to provide a simple and effective way to allow the occupant to "sink" into the seat back cushion in a controlled fashion thereby resulting in controlled contact between the occupant's head and the vehicle headrest. The seat back cushion includes a plurality of indentations in a back surface that facilitate the controlled deformation of the seat back cushion when a force from an occupant is applied to a forward surface of the seat back cushion such as is typical in a rear impact event.

A seat back cushion for a vehicle according to one disclosed non-limiting embodiment includes a back surface including a plurality of indentations, the plurality of indentations including a plurality of generally vertical indentations and a plurality of generally horizontal indentations A seat back cushion for a vehicle, according to another disclosed non-limiting embodiment, includes a back surface with a plurality of indentations, the plurality of indentations including a plurality of generally vertical indentations, the plurality of generally vertical indentations includes a central vertical indentation along a central longitudinal axis that passes through an H-point.

A seat back cushion for a vehicle, according to another disclosed non-limiting embodiment, includes a back surface including a plurality of indentations, the plurality of indentations including a plurality of generally horizontal indentations, the plurality of generally horizontal indentations below a Th1-point and above an H-point.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A seat back cushion with a back surface that includes a plurality of indentations that facilitate controlled deformation of the seat back cushion is disclosed.

Figure 1:
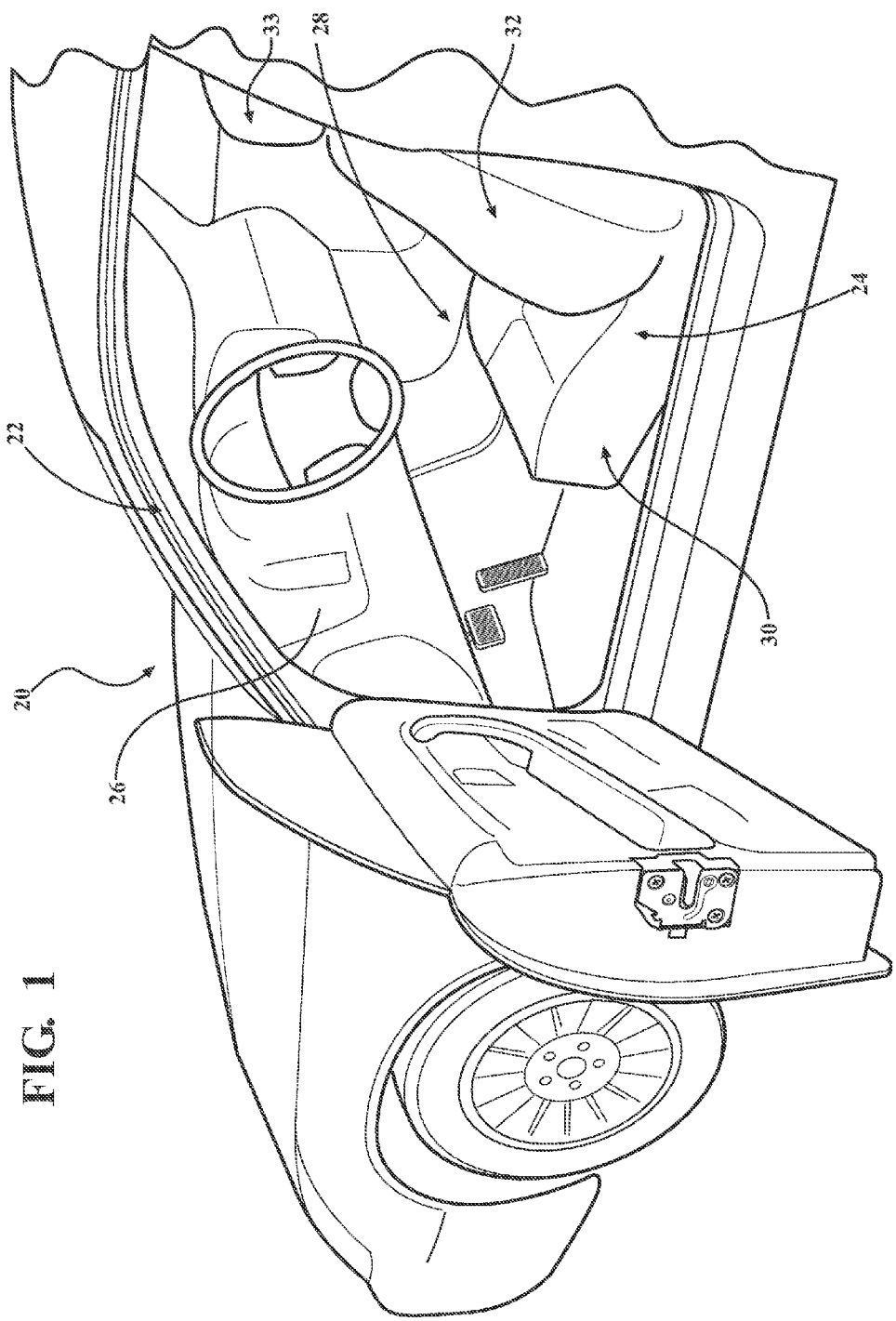
FIG. 1 is a partial perspective view of a vehicle occupant compartment.

FIG. 1 schematically illustrates selected portions of a vehicle 20. The vehicle 20 generally includes a body 22 with a vehicle seat 24 aft of an instrument panel 26 within an occupant seating area 28. The vehicle seat 24 generally includes a lower seat structure 30, a seat back structure 32, and a headrest 33. Although the vehicle seat 24 of the driver is illustrated in the disclosed non-limiting embodiment, it should be appreciated that other occupant positions such as a rear seat as well as other vehicles will also benefit herefrom.

Figure 2:
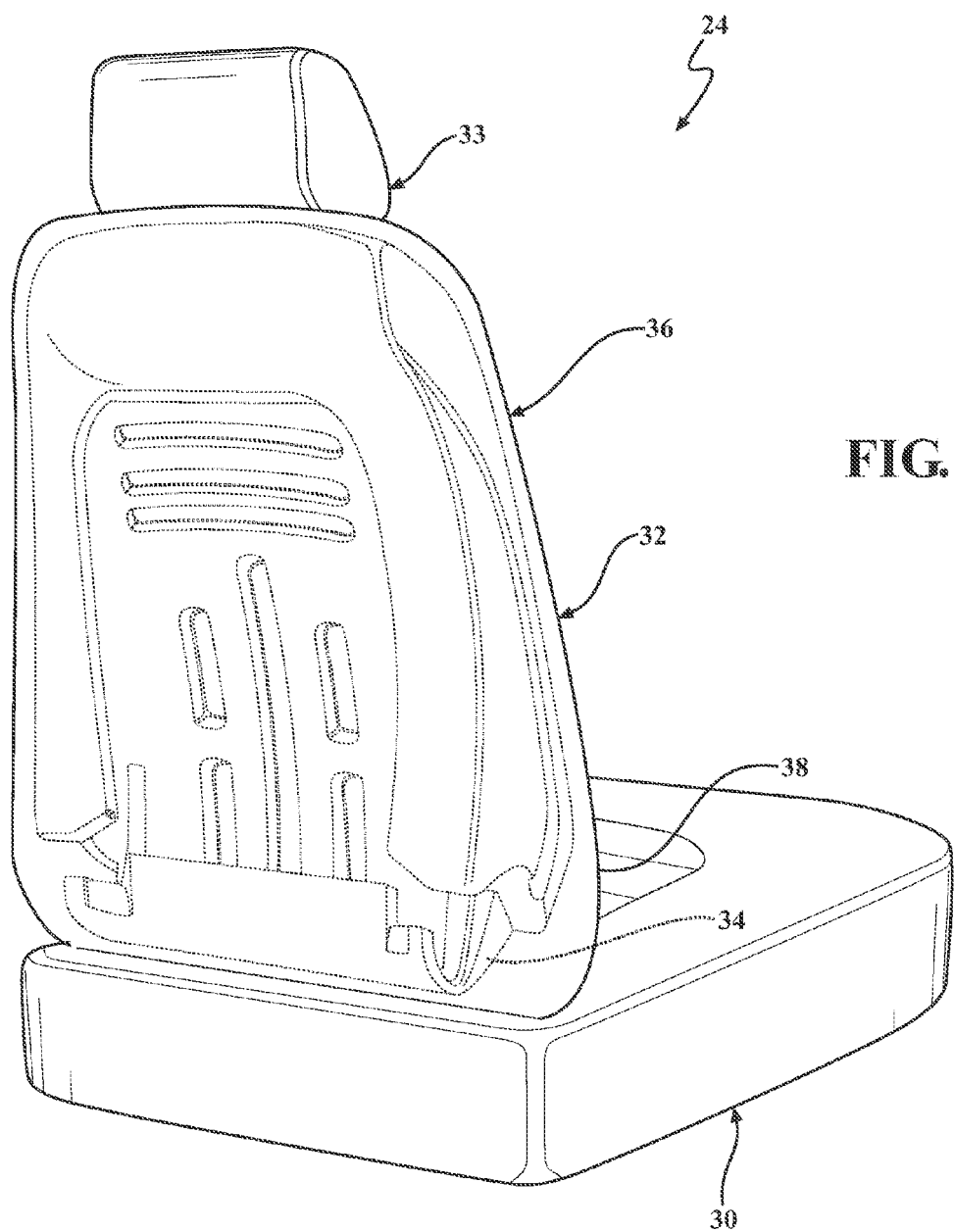
FIG. 2 is a perspective view of a vehicle seat with seat back cushion.

With reference to FIG. 2, the seat back structure 32 generally includes a frame 34 (illustrated schematically), a seat back cushion 36, and a cover 38. It should be appreciated that various other systems, such an airbag, may be additionally included within the seat back structure 32. The frame 34 is typically manufactured of a metal alloy or composite material to provide support for the seat back cushion 36. The seat back cushion 36 may be manufactured of a urethane while the cover 38 may be manufactured of a cloth or leather to provide a durable and aesthetic seating surface.

Figure 3:
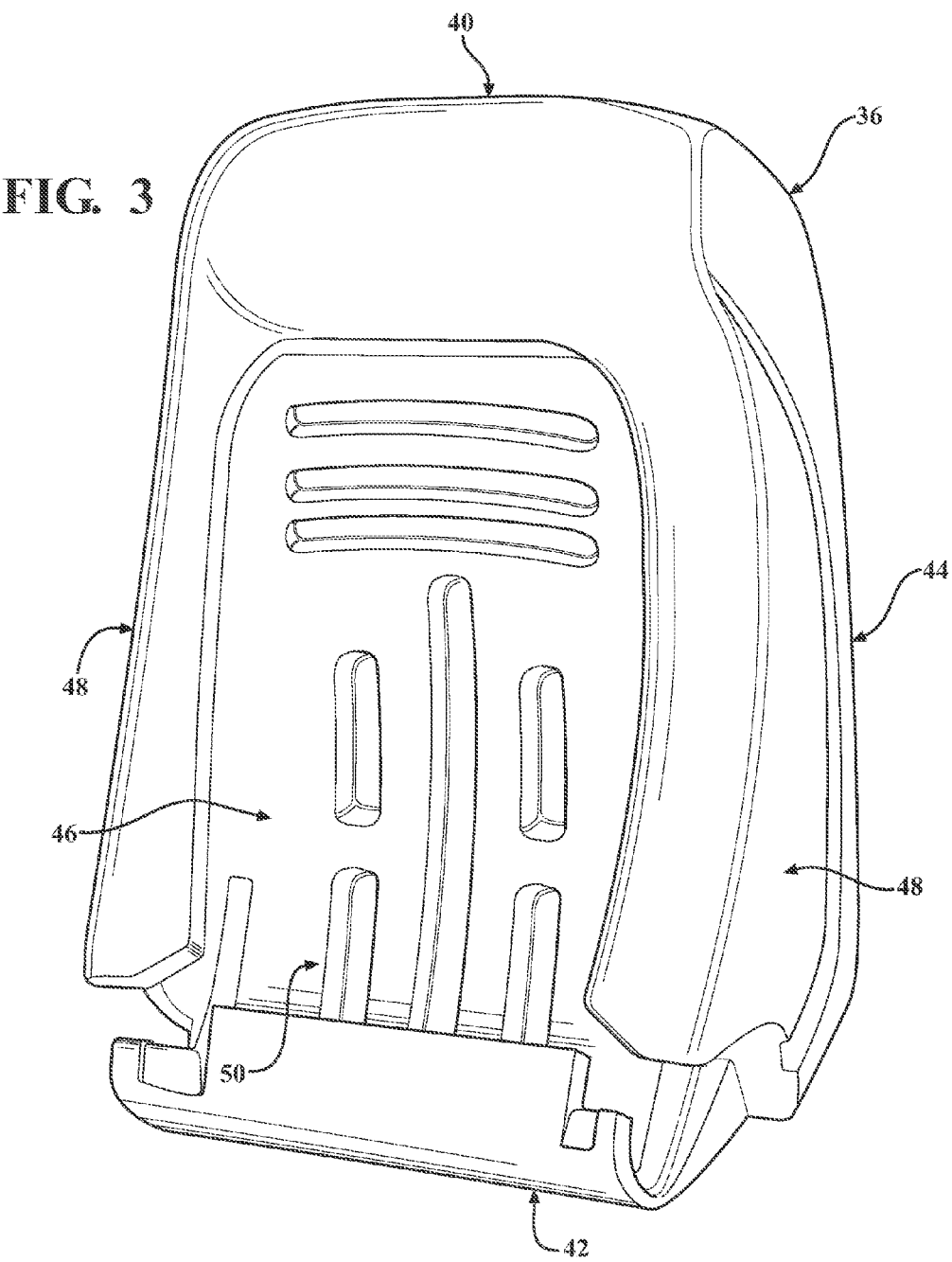
FIG. 3 is perspective rear view of the seat back cushion.

With reference to FIG. 3, the seat back cushion 36 generally includes a top surface 40, a bottom surface 42, a forward surface 44, a back surface 46, and side surfaces 48. It should be appreciated that seat back cushions 36 of various geometries and shapes will benefit herefrom.

The back surface 46 includes a plurality of indentations 50 that facilitate controlled deformation of the seat back cushion 36 when a force from an occupant is applied to the forward surface 44 such as is typical in a rear impact event. That is, the force from the rear impact event causes the occupant to be forced rearward into the forward surface 44. The plurality of indentations 50 then facilitate deformation of the seat back cushion 36 and allow the occupant to "sink" into the seat back cushion 36 in a controlled fashion thereby resulting in controlled contact between the occupant's head and the headrest 33.

Figure 4:
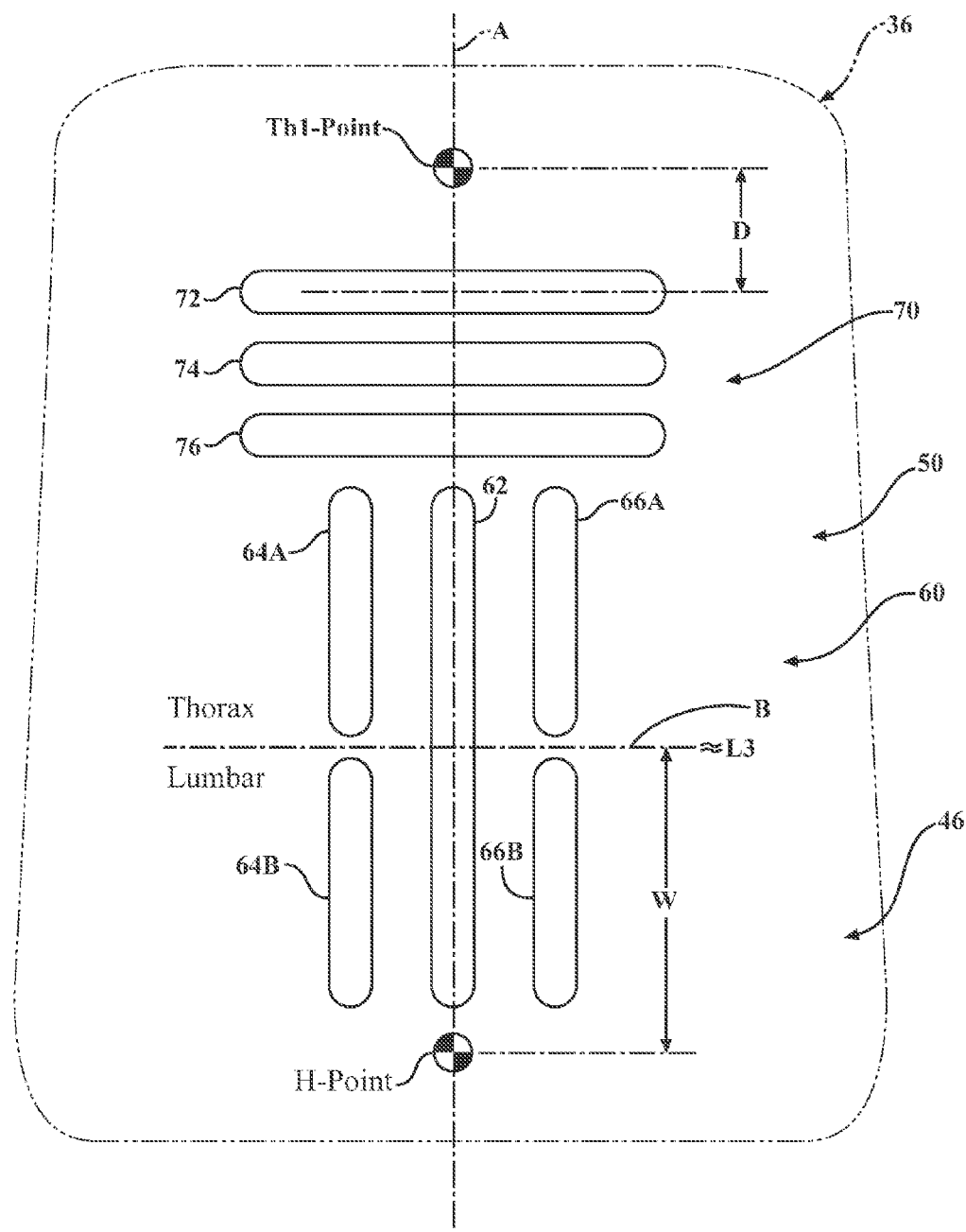
FIG. 4 is schematic rear view of the seat back cushion.

With reference to FIG. 4, in one disclosed non-limiting embodiment, the plurality of indentations 50 generally includes a plurality of generally vertical indentations 60, and a plurality of generally horizontal indentations 70 between an H-point, and a Th1-point. The vertical indentations 60 are generally located between the plurality of generally horizontal indentations 70 and the H-point to form a respective "T" shape. In this disclosed non-limiting embodiment, each of the plurality of indentations 50 are generally race track shaped and are about 20 mm wide by about 10 mm deep. Alternatively, or in addition, the side surfaces 48 (FIG. 3) may be relieved such that bolster areas of the seat back cushion 36 are relatively soft.

The H-point (or hip-point) is the theoretical, relative location of an occupant's hip, specifically, the pivot point between the torso and thigh. The H-point can be measured relative to other features, such as a floor of the vehicle 20 or the height above pavement. A vehicle 20 with a "high H-point" may have an H-point that is "high" relative to the vehicle floor, the road surface, or both. The H-point, as often defined in national and international vehicle design standards, is typically related to the hip joint of a 50th percentile male occupant (AM50) driver and a 5th percentile female occupant (AF05) passenger viewed laterally. For further perspective, the Society of Automotive Engineers (SAE) J1100 Interior Measurement Index sets parameters for such measurements as H30 (H-point to vehicle floor), HS (H-point to pavement surface), H61 (H-point to interior ceiling), and H25 (H-point to windowsill).

In this disclosed non-limiting embodiment, the plurality of generally vertical indentations 60 includes a central vertical indentation 62 along a central axis A that passes through the H-point. The central vertical indentation 62 is vertically centered about a lateral axis B that is perpendicular to axis A. The lateral axis B is at a distance "W" of about 100-200 mm from the H-point and thereby proximate to the lumbar apex at about L3. In one preferred embodiment, the lateral axis B is at a distance "W" of about 150 mm+/−a tolerance such as 50 mm, 25 mm or 15 mm. That is, the intersection of the axes A, B is centered along the central vertical indentation 62, and the H-point is directly below the central vertical indentation 62.

Figure 5:
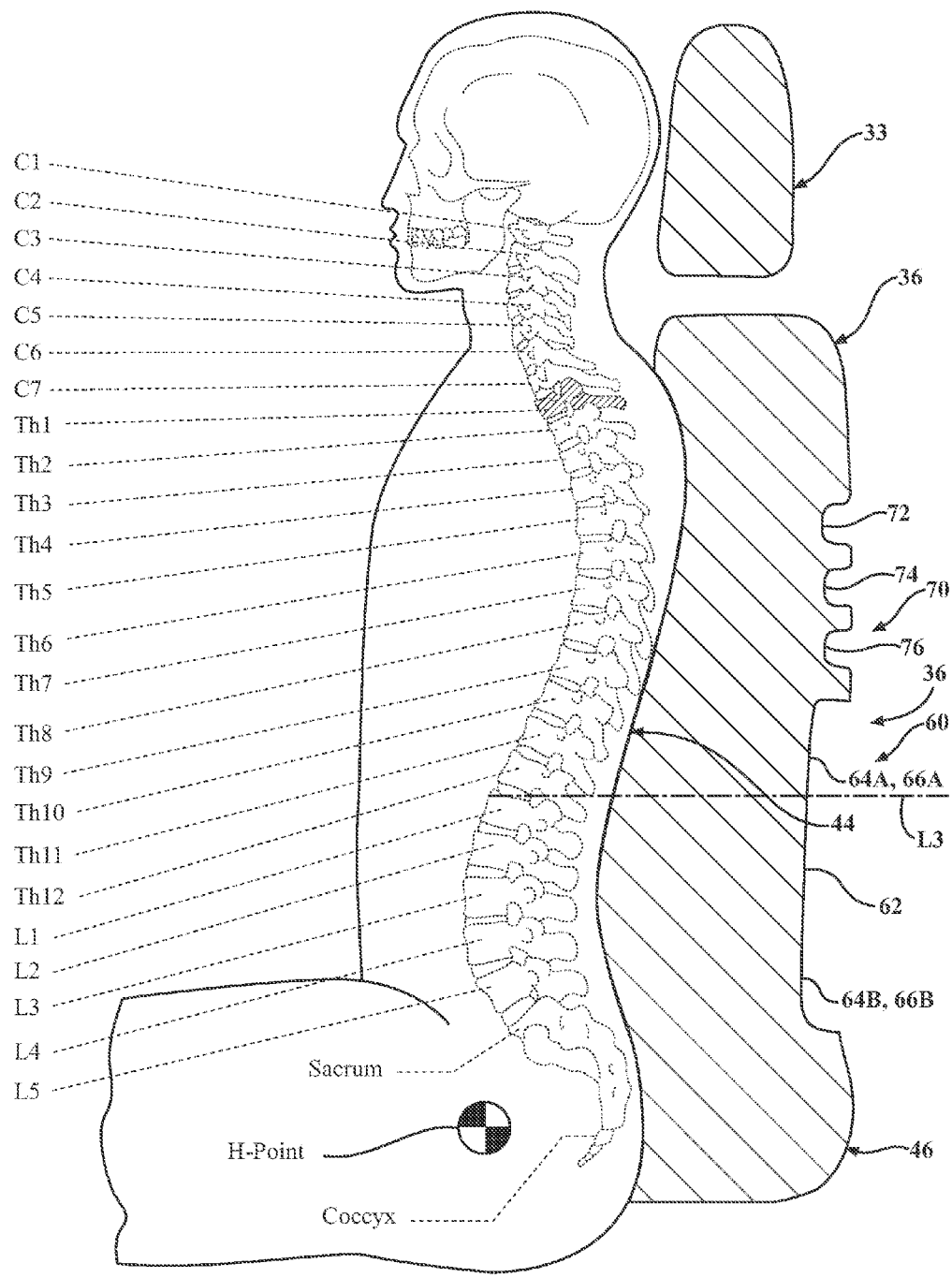
FIG. 5 is a schematic side sectional view of a vehicle seat with a seat back cushion adjacent to an occupant seated thereon.

The lateral axis B generally defines the apex of the lumbar spine area of the occupant below the thorax (FIG. 5). The thoracic spine area is the middle segment of the vertebral column, between the cervical vertebrae and the lumbar vertebrae. There are twelve thoracic vertebrae and they are intermediate in size between the cervical and lumbar vertebrae; they increase in size towards the lumbar vertebrae. By convention, the human thoracic vertebrae are numbered Th1-Th12, with the first one (Th1) located closest to the skull and the others going down the spine towards the lumbar region. The lumbar spine area generally refers to the lower back, where the spine curves inward toward the abdomen. The lumbar spine area starts below the shoulder blades, and connects with the thoracic spine at the top and extends downward to the sacral spine.

The plurality of generally vertical indentations 60 further includes flanking, segmented vertical indentations 64A, 64B, 66A, 66B. The vertical indentations 64A, 66A are above the lateral axis B, while the vertical indentations 64B, 66B are below the lateral axis B with respect to the H-point.

In this disclosed non-limiting embodiment, the plurality of generally horizontal indentations 70 includes three horizontal indentations 72, 74, 76. In this disclosed non-limiting embodiment, the horizontal indentation 72 is located a distance "D" of about 100 mm below the Th1-point and about 520 mm above the H-point. Horizontal indentations 74, 76 are respectively about 460 mm and about 400 mm above the H-point. It should be appreciated that other distances and spacing will benefit herefrom.

Figure 6:
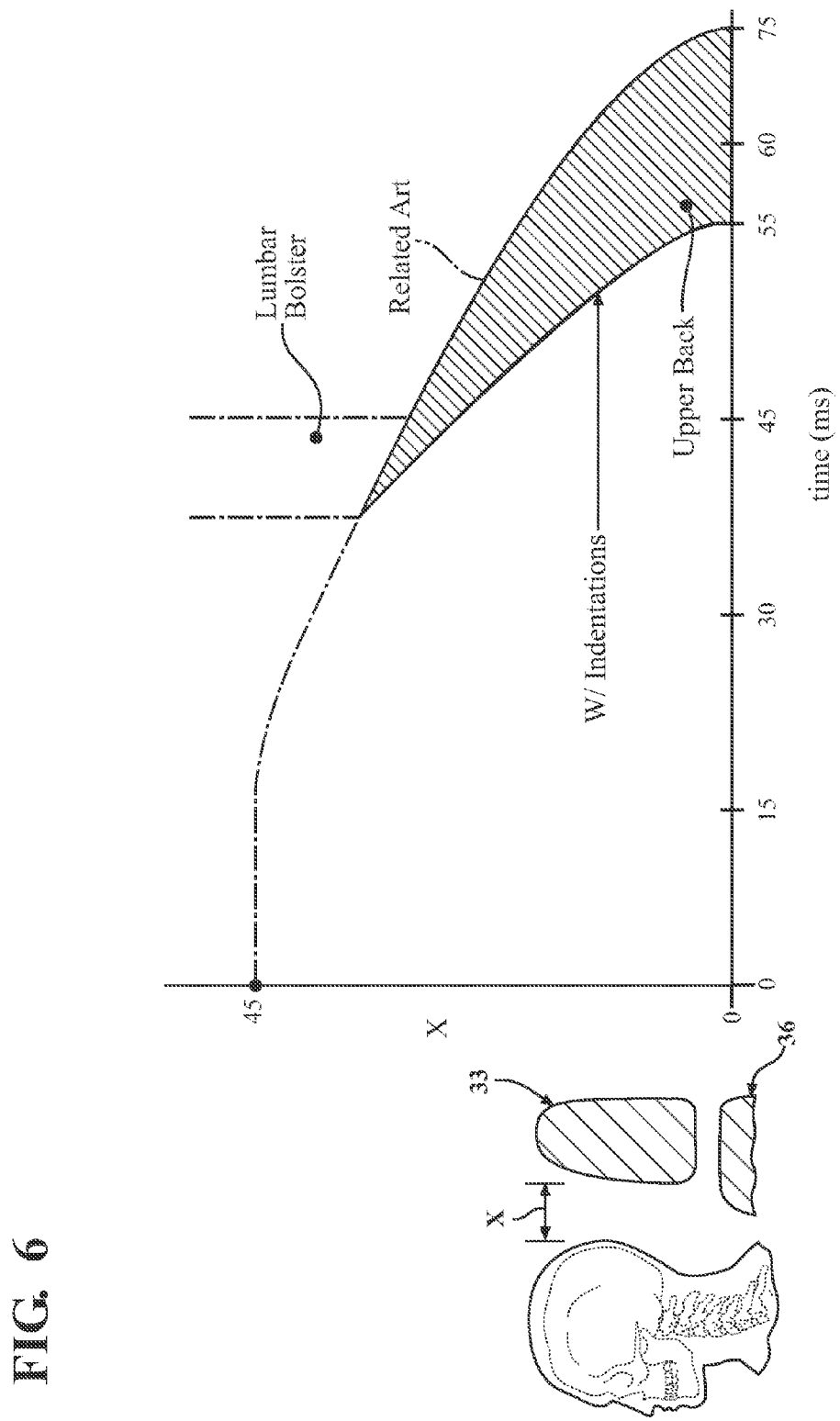
FIG. 6 is a graphical representation of a head position over time to compare the seat back cushion with indentations according to one disclosed non-limiting embodiment, with a standard seat back cushion without indentations.

With reference to FIG. 6, and as will be further discussed below, the plurality of indentations 50 facilitate controlled deformation of the seat back cushion 36 that allows the occupant to "sink" into the seat back cushion 36 in a controlled fashion thereby resulting in controlled contact between the occupant's head and the headrest 33.

Initially, the occupant's head is displaced a distance "X" of about 45 mm from the headrest 33. It should be appreciated that this is merely a typical example of distance. In response to a rear impact event, such as collision with the rear of the occupant's vehicle 20 when the occupant's vehicle 20 is stopped, the plurality of generally vertical indentations 60 permit the occupant to "sink" into the seat back cushion 36 between time 37-45 milliseconds and thus begin to close the 45 mm gap "X" from the headrest 33 as compared to a conventional seat back cushion.

The plurality of generally horizontal indentations 70 further operate to articulate the occupant such that the gap "X" between the occupant's head and the headrest 33 is closed at about 55 milliseconds after the impact event. This is as compared to about 75 milliseconds for a conventional seat back cushion without the plurality of indentations 50. Such a reduction in time readily facilitates the safety of the occupant.

It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A vehicle seat, comprising:
   a frame;
   a seat back cushion supported by the frame, the seat back cushion defining a forward surface and a back surface, and having an H-point, a Th1-point and a lateral axis between the H-point and the Th1-point;
   a headrest supported atop the seat back cushion; and
   a system for facilitating controlled contact between an occupant's head and the headrest via controlled deformation of the seat back cushion when a force from the occupant is applied to the seat back cushion's forward surface, the system consisting essentially of:
   a plurality of elongate generally vertical indentations defined at the seat back cushion's back surface across a lower area extending upward from the H-point and vertically centered about the lateral axis, and
   a plurality of elongate generally horizontal indentations defined at the seat back cushion's back surface across an upper area extending downward from the Th1-point to the lower area.

2. The vehicle seat as recited in claim 1, wherein the plurality of generally vertical indentations and the plurality of generally horizontal indentations are located between the H-point and the Th1-point.

3. The vehicle seat as recited in claim 1, wherein the plurality of generally vertical indentations and the plurality of generally horizontal indentations form a "T" shape.

4. The vehicle seat as recited in claim 3, wherein the plurality of generally vertical indentations includes a central vertical indentation along a central longitudinal axis that passes through the H-point.

5. The vehicle seat as recited in claim 4, wherein the central vertical indentation is centered about the lateral axis, and the lateral axis is perpendicular to the longitudinal axis.

6. The vehicle seat as recited in claim 5, wherein the lateral axis is at a distance of about 100-200 mm from the H-point.

7. The vehicle seat as recited in claim 5, wherein the lateral axis is proximate to a lumbar apex.

8. The vehicle seat as recited in claim 4, wherein the H-point is below the central vertical indentation.

9. The vehicle seat as recited in claim 1, wherein the plurality of generally horizontal indentations includes three horizontal indentations.

10. The vehicle seat as recited in claim 1, wherein one of the plurality of generally horizontal indentations is about 100 mm below the Th1-point.

11. The seat back cushion as recited in claim 1, wherein one of the plurality of generally horizontal indentations is about 100 mm below the Th1-point and about 520 mm above the H-point.

12. The vehicle seat as recited in claim 1, wherein the lateral axis separates a thoracic spine area from a lumbar spine area.

13. The vehicle seat as recited in claim 1, wherein each of the plurality of generally vertical indentations is generally race track shaped.

14. The vehicle seat as recited in claim 1, wherein each of the plurality of generally horizontal indentations is generally race track shaped.

15. The vehicle seat as recited in claim 1, wherein each of the plurality of generally vertical indentations is about 20 mm wide by about 10 mm deep.

16. The vehicle seat as recited in claim 1, wherein each of the plurality of generally horizontal indentations is about 20 mm wide by about 10 mm deep.

* * * * *